United States Patent
Mietke

(10) Patent No.: US 12,411,682 B2
(45) Date of Patent: Sep. 9, 2025

(54) INVERSION PROCESS FOR RULES FRAMEWORK

(71) Applicant: SAP SE, Walldorf (DE)

(72) Inventor: Sebastian Mietke, Reilingen (DE)

(73) Assignee: SAP SE, Walldorf (DE)

( * ) Notice: Subject to any disclaimer, the term of this patent is extended or adjusted under 35 U.S.C. 154(b) by 286 days.

(21) Appl. No.: 17/964,409

(22) Filed: Oct. 12, 2022

(65) Prior Publication Data

US 2024/0126541 A1   Apr. 18, 2024

(51) Int. Cl.
*G06F 8/71* (2018.01)
*G06F 9/54* (2006.01)

(52) U.S. Cl.
CPC .............. *G06F 8/71* (2013.01); *G06F 9/542* (2013.01)

(58) Field of Classification Search
CPC .................................... G06F 8/71; G06F 9/542
See application file for complete search history.

(56) References Cited

U.S. PATENT DOCUMENTS

| | | | | |
|---|---|---|---|---|
| 7,149,675 B2 * | 12/2006 | Hoskote | .............. | G06F 30/3323 |
| | | | | 703/15 |
| 7,240,063 B2 * | 7/2007 | Aoyama | ................ | G06F 16/258 |
| 7,831,649 B2 * | 11/2010 | Cho | ....................... | H04L 27/263 |
| | | | | 708/404 |
| 8,479,016 B2 * | 7/2013 | Michiels | ................. | H04L 9/002 |
| | | | | 713/189 |
| 8,869,098 B2 * | 10/2014 | Elaasar | ...................... | G06F 8/10 |
| | | | | 717/136 |
| 9,201,762 B1 * | 12/2015 | Chen | ...................... | G06F 11/362 |
| 9,330,117 B2 * | 5/2016 | Nguyen | .............. | G06F 16/2282 |
| 9,779,429 B2 * | 10/2017 | Borkowski | ........ | G06Q 30/0283 |
| 10,678,522 B1 * | 6/2020 | Yerramreddy | ............ | G06F 8/10 |
| 11,018,854 B2 * | 5/2021 | Fernandez | ............ | H04L 9/0662 |
| 11,256,557 B1 * | 2/2022 | Amin | ....................... | G06F 9/547 |
| 11,614,951 B2 * | 3/2023 | Shrivastava | ........ | G06F 9/45529 |
| | | | | 719/331 |
| 11,647,188 B2 * | 5/2023 | Francois | .............. | H04N 19/119 |
| | | | | 375/240.02 |
| 2007/0260976 A1 * | 11/2007 | Slein | ...................... | G06F 40/143 |
| 2008/0275829 A1 * | 11/2008 | Stull | ......................... | H04L 9/00 |
| | | | | 726/26 |

(Continued)

*Primary Examiner* — Douglas M Slachta
(74) *Attorney, Agent, or Firm* — Buckley, Maschoff & Talwalkar LLC

(57) ABSTRACT

Provided is a system and method for inverting custom rules of a software program to ensure compatibility with other possible rules of the software program. The inverted rules are always stored in a unified format. In one example, the method may include detecting a custom rule within a software program. The custom rule may include one or more input values, one or more output values, and a plurality of conditions for converting the one or more input values into the one or more output values, The method may also include generating an inverse of the custom rule, wherein the inverse of the custom rule comprises a plurality of inverse statements, and each inverse statement includes an output value mapped to an input value and a different condition among the plurality of conditions. The method may also include updating a rules repository associated with the software program with the inverse of the custom rule.

20 Claims, 9 Drawing Sheets

(56) References Cited

U.S. PATENT DOCUMENTS

| | | | | |
|---|---|---|---|---|
| 2010/0030604 A1* | 2/2010 | Cummins | .......... | G06Q 10/0633 706/47 |
| 2012/0166459 A1* | 6/2012 | Ritter | .................... | G06F 16/258 707/756 |
| 2012/0239680 A1* | 9/2012 | Gudla | .................... | G06Q 90/00 707/769 |
| 2012/0254090 A1* | 10/2012 | Burris | .................... | G06N 5/027 706/47 |
| 2012/0254193 A1* | 10/2012 | Chattopadhyay | ..... | G06F 16/245 707/747 |
| 2014/0040334 A1* | 2/2014 | Burgess | ................ | G06F 1/0353 708/235 |
| 2017/0353302 A1* | 12/2017 | Fernandez | ................ | H04L 9/14 |
| 2018/0107478 A1* | 4/2018 | Codato | .................... | G06F 8/71 |
| 2019/0122127 A1* | 4/2019 | Ali | ........................ | G06N 5/025 |
| 2021/0357577 A1* | 11/2021 | Portisch | ................ | G06F 16/254 |
| 2022/0198014 A1* | 6/2022 | Boling | .................... | G06F 9/3861 |

\* cited by examiner

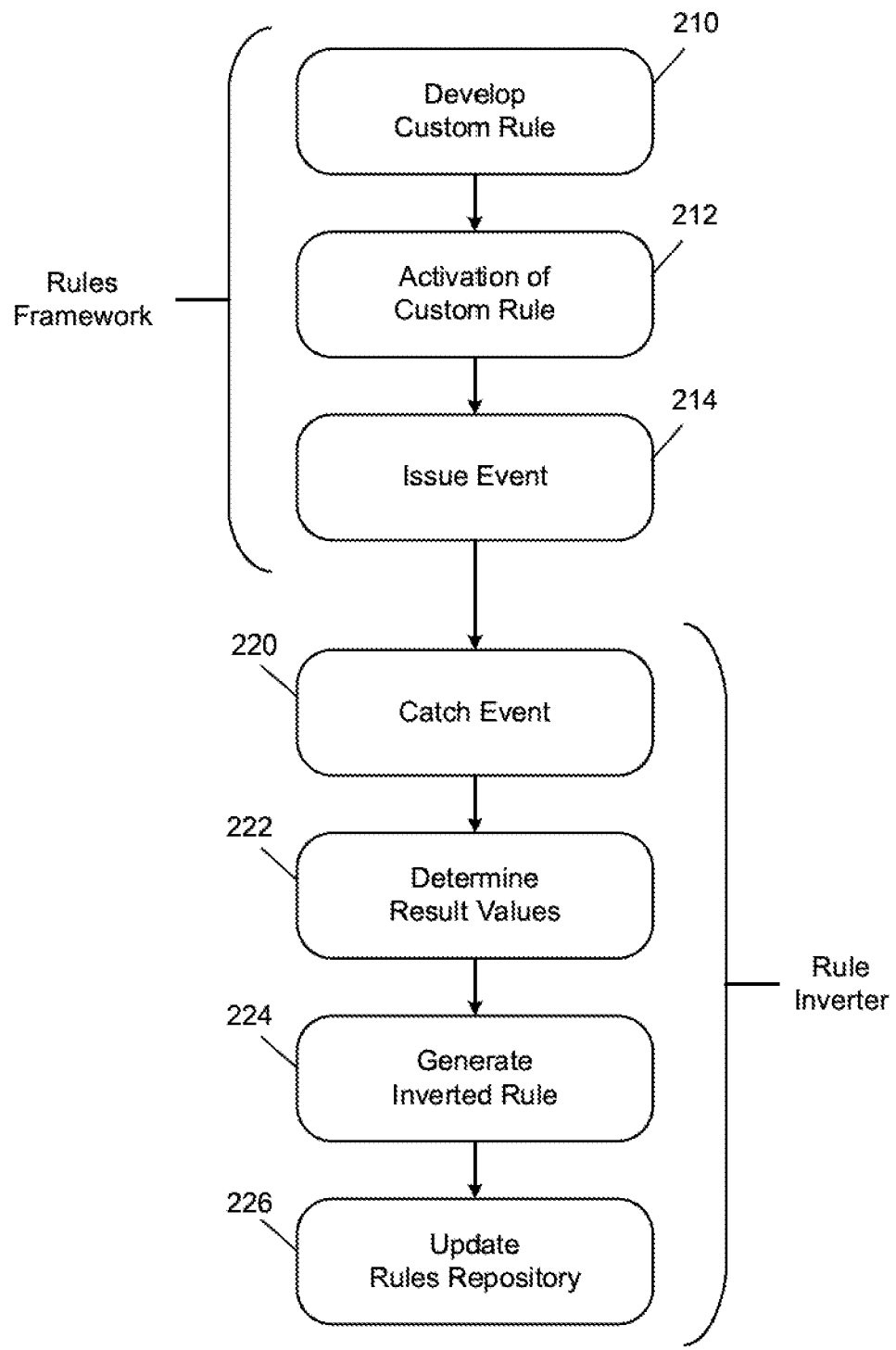

310  FIG. 3A
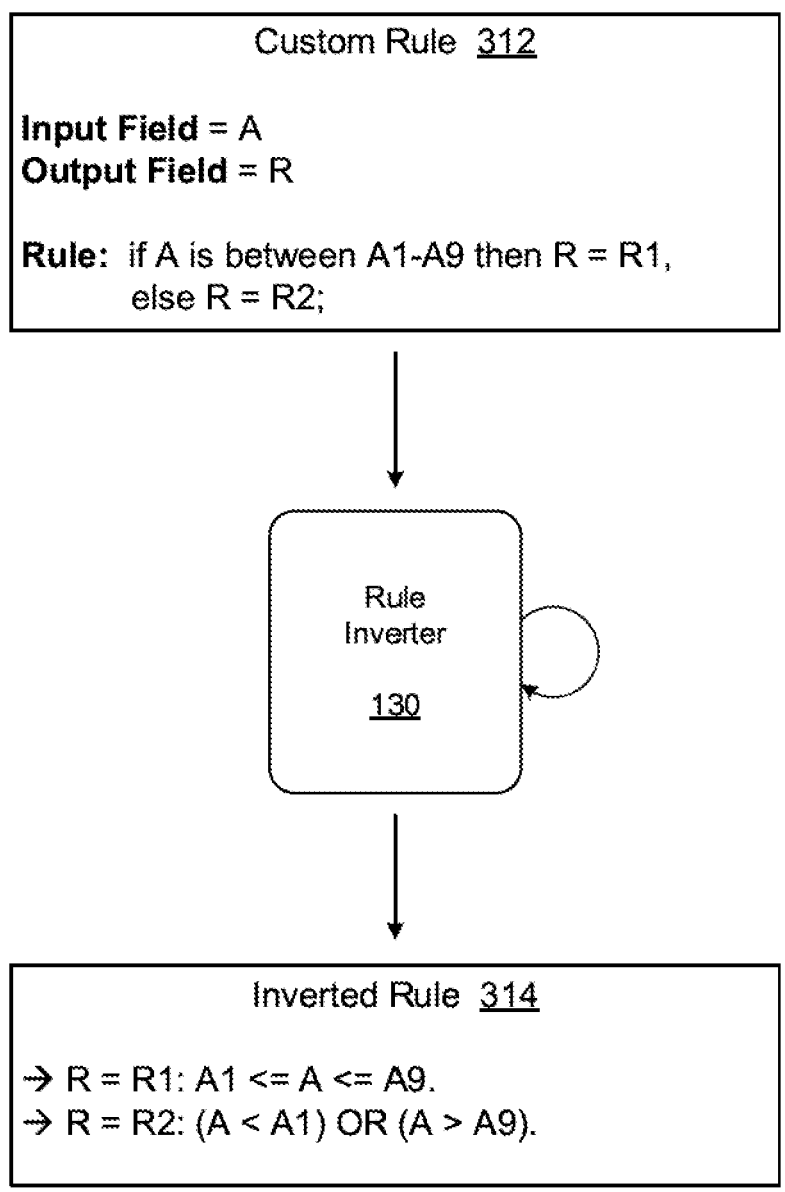

Custom Rule 322

Input Field 1 = A
Input Field 2 = B
Output Field = R

Rule: if A=A1 and B=B1 then R=R1,
else if A in between A1-A5, then R=R2,
else if B in between B1-B3, then R=R3,
else R = R4.

---

Rule Inverter

130

---

Inverted Rule 324

→ R = R1: A = A1 and B = B1.
→ R = R2: A1 <= A <= A5.
→ R = R3: B1 <= B <= B3.
→ R = R4: NOT((A = A1 and B = B1) OR (A1 <= A <= A5) OR
(B1 <= B <= B3)).

Custom Rule 342

Input Field = A
Output Field = R
\*\* The rule depends on a field F, which is retrieved from A

Rule: if F = F1 OR F2 then R = F,
else R = R1.

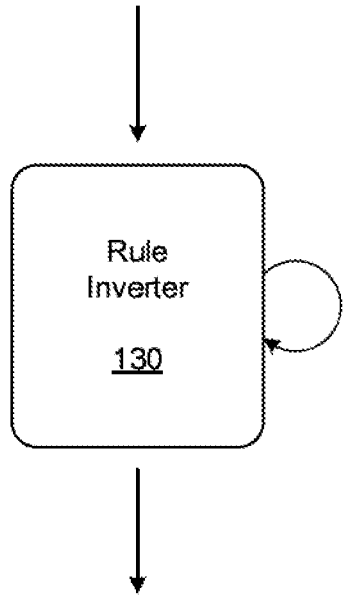

Rule Inverter

130

Inverted Rule 344

→ R = F1: EXISTS (SELECT F_FIELD FROM F_TAB WHERE A_FIELD = A AND F_FIELD = F1).

→ R = F2: EXISTS (SELECT F_FIELD FROM F_TAB WHERE A_FIELD = A AND F_FIELD = F2).

→ R = R1: NOT EXISTS ((SELECT F_FIELD FROM F_TAB WHERE A_FIELD = A) AND (F_FIELD = F1 OR F_FIELD = F2))

INVERSION PROCESS FOR RULES FRAMEWORK

BACKGROUND

Software programs can provide developers with different configuration options. Even if the programs are standardized on a high level, each customer might have specific requirements, algorithms, and the like, which can lead to a unique implementation of the software program. An example of a configuration option is the implementation of custom rules. Recently, organizations and providers have begun offering different custom rule frameworks (rules engine) such as, but not limited to, BAdI, BRF+, Custom Substitution and Validation Tool, HANA® Rules Framework, and the like. Through such a framework, a developer can create custom rules configured to make automated decisions such as converting an input value into an output value, as well as logic for such conversion.

One of the drawbacks with such rules engine is that developers can create different rules in which different respective input values are converted into the same output value. As another example, developers can create different rules in which a same input value is converted to different output values. These rules can conflict and lead to problems when the rules engine applies a rule to a situation/query. It is often of special interest to determine all input values leading to a same output. However, it can be very difficult for a person to determine all possible inputs and all possible outputs of their developed rules. In order to address this problem, developers may execute the rules on a periodic basis to test them out and develop complex workarounds when rules interfere with one another. But this process is error prone, time consuming, and expensive.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2 is a diagram illustrating a process of detecting activation of a rule and converting the rule into an inverse rule in accordance with example embodiments.

FIGS. 3A-3D are diagrams illustrating different examples of converting a rule into an inverse rule in accordance with example embodiments.

Figure 1A:
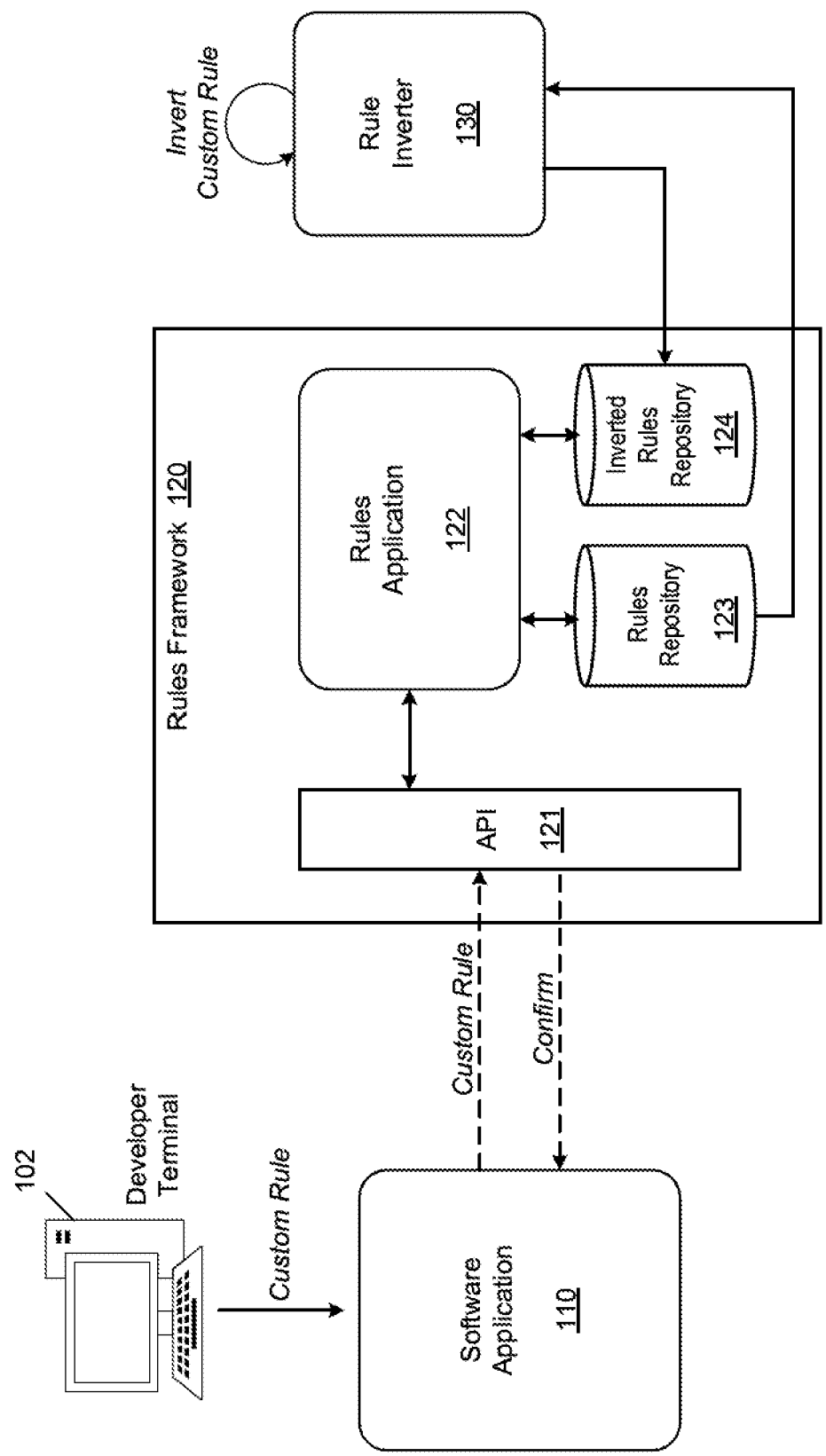
FIGS. 1A-1B are diagrams illustrating processes for converting a rule in accordance with example embodiments

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

As described herein, a system can convert a software rule (e.g., retrieved from a rules framework, etc.) into an inverted form. The original rule may remain in the rules repository and the inverted form of the software rule may be stored in an inverted rules repository of the rules framework. The inverted version of the rule can be used by the host system to determine all possible input values, leading to a same output. In some embodiments, both the original version of the rule and the inverted version of the rule may be kept by the system. Furthermore, a linkage such as an identifier of the original rule may be stored in the inverted version of the rule. As an example, an identifier of the original rule within the system can be assigned to the inverted version. Meanwhile, the original version of the rule may remain in the rules engine repository. The inverted version is stored in the inverted rules repository. The original rule has to be executed by the rules framework, to retrieve the output for a given input. The inverted rule may be reflected by a mapping table, which assigns conditions for each possible output. Therefore, it can easily be consumed, without executing the rules framework.

A software rule may include a mapping between one or more input values and one or more output values, as well as conditions associated with each. The mapping may be based on predefined logic (rule) that defines when or under what conditions to convert the predefined input value to the predefined output value. Various rules frameworks allow developers to create custom rules that can be plugged into generic software applications essentially customizing the generic software application. However, it is difficult for developers (especially in large groups) to ensure that the custom rules are all in sync with one another and not conflicts or confusion exists.

In the example embodiments, a software rule can be inverted (i.e., written so that the rule starts with the predetermined output value instead of the predetermined input value. By inverting the software rule, the system can deterministically establish how each predefined output value is derived rather than mapping predetermined input values to predetermined output values as is done in the original software rule. Furthermore, when the rule includes multiple output values, the rule inverter can disambiguate the different the conditions that are associated with each of the particularly output values. For example, within the inverse of the custom rule, each output value may be mapped on a one-to-one basis to a respective condition. Thus, it is clear how each output value is created. This inversion of the rule can improve the performance of the software when executing the rule. In particular, the rule will not cause errors since it is clear as to what creates each output value.

Below is a simple example of a first software rule:
Input value=A

Output value=B
Rule 1: if A is between A1-A8, then B=B1,
    else B=B2

In the first software rule, an input value is mapped to an output value based on logic that defines which input values create which output values. Below is an example of a second software rule that overlaps with the first software rule:

Input value=A
Output value=B
Rule 2: if A is A1 then B=B2,
    else B=B3

The two software rules above are in conflict because the same input value (A1) is mapped to two different output values (B1 and B2). This can cause the rules framework to experience errors and inconsistencies. Therefore, in many cases, developers spend a significant amount of time testing and checking custom rules to ensure that they comply with the system and that no other errors or issues are experienced.

However, this process of testing and checking can be a significant and time consuming process. Furthermore, it's not easy to determine all possible input values which lead to a particular output. This especially for custom derived rules, from an analysis perspective. To gather that information, the rule might be executed for each relevant input value. Afterwards, the input could be grouped by output and filtered accordingly. This is how this issue is currently addressed in many cases.

In the example embodiments, a service (rule inverter) is able to invert a custom software rule to clearly define how each possible output value is derived. Furthermore, the rules framework may be modified (e.g., via a plug-in, etc.) to include an event handler that detects inclusion (e.g., activation, etc.) of a custom rule within the rules framework and notifies the rule inverter service. The combination of the event handler included in the rules framework and the rule inverter service can work together to invert custom-defined rules to prevent inconsistencies among all rules within the rules framework and clearly define how each output value is derived within the rule. When the software program executes, the inverted rules may be called instead of the or in addition to the original rule. The result is a more efficient/deterministic execution of the rule at runtime which can lead to improved processing time and less error.

Some of the benefits of the custom rule inversion process include automatically detecting activation of a custom rule within the rules framework and converting the custom rule into its inverse without a user needing to take any actions. Furthermore, the rule can be developed such that each possible output value is mapped to all possible input values. Thus a developer does not need to execute/test the custom rules within the rules framework frequently. Instead, result conditions are derived by the software system, automatically after activation of (changed) custom rules. Another benefit of the example embodiments is that the rules framework doesn't have to be executed for all possible relevant data. This is beneficial in terms of performance. Instead, only the relevant data is retrieved, without executing the rules framework. This offers additional analysis capabilities, which fill existing gaps in the art. Accordingly, the inversion of a custom software rule can be used to enhance the analysis capability of the software system. In particular, an analysis-based application can now report on data which is originally coming from custom rules. This was not easily possible in the past, since the rules would have to be executed to get the output values (not always possible, e.g. in a CDS view stack). The rules inversion provides information about possible output values and their conditions. This information can just be consumed from the repository. There is no need to execute the rules.

Furthermore, one of the drawbacks of custom rules is that they cannot typically be executed within Core Data Services (CDS views) of a database such as the SAP HANA® database. The CDS views are able to provide virtual data models which allow direct access to underlying table data within the database. In the example embodiments, the rule inverter can create an inverted version of the custom rule which is compatible with CDS views and can be used to create commands within the CDS views such as structured query language (SQL) commands, and the like. The inverted rule is compatible since the information can be directly retrieved from the repository without executing the rules. Furthermore, in the example embodiments, the content from the inverted rule may be added to a clause within the SQL command, for example, a WHERE clause within an SQL query. The WHERE clause is used to filter records and only retrieve the records necessary for the particular query. The conditions within the inverted rule may be matched to the corresponding WHERE clause and stored therein before submitting the SQL query to a database such as a relational database associated with or otherwise coupled to the host platform.

Figure 1B:
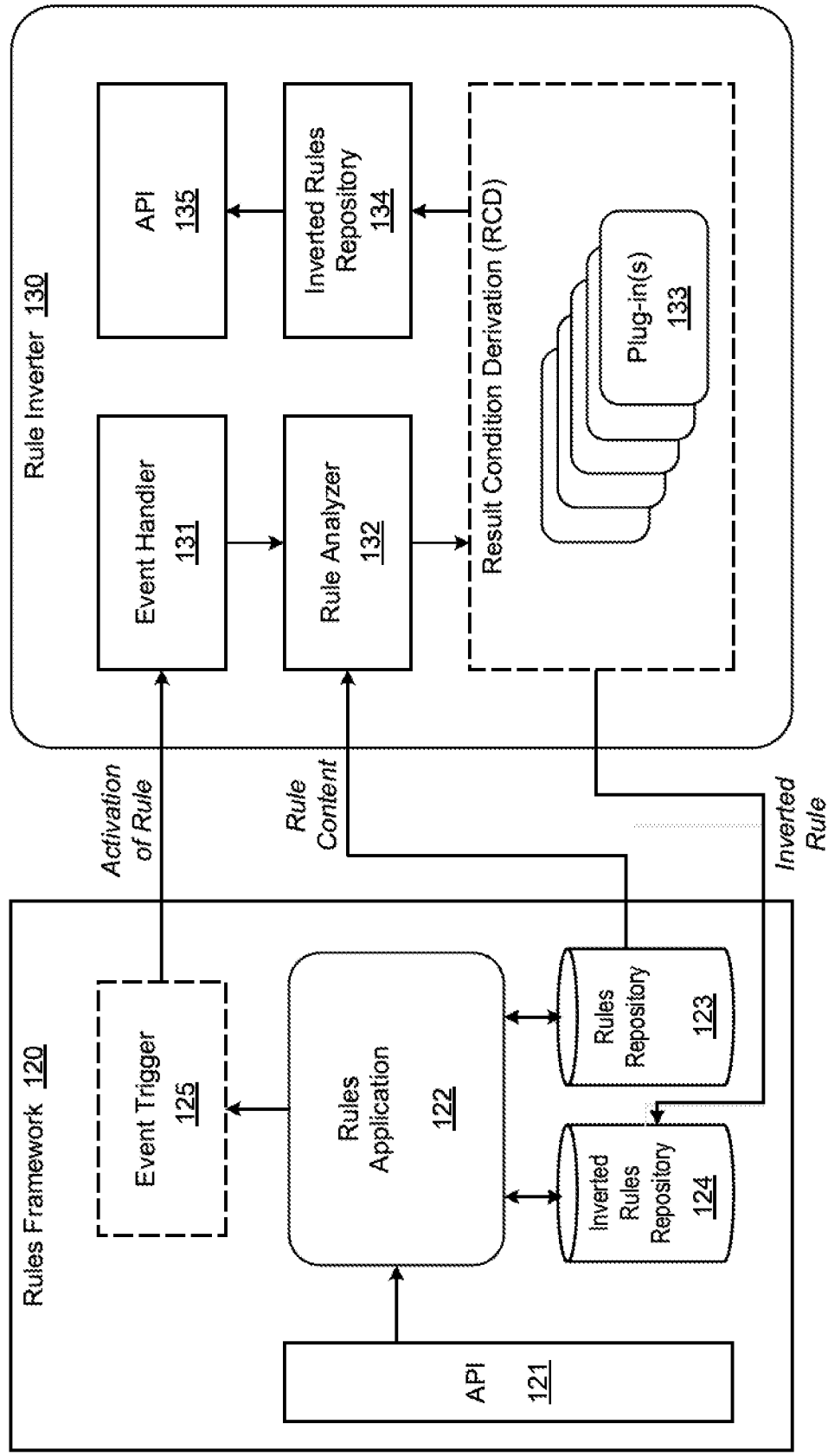

FIGS. 1A-1B illustrate examples of processes for converting a rule via a rules framework 120 and a rule inverter 130 in accordance with example embodiments. FIG. 1A is a general overview while FIG. 1B is a more detailed view. In the examples herein, the rules framework 120 can be modified or otherwise enhanced with a rule inverter 130 according to various embodiments. The rule inverter 130 may be integrated into the rules framework 120 via a plug-in, software update, etc. which integrates the rule inverter 130 into the rules framework 120. As another example, the rule inverter 130 may be an external web service and the rules framework 120 could be modified to interact with the external web service, for example, using application programming interface (API) calls from the rules framework 120 to the external web service that hosts the rule inverter 130.

Regardless of the implementation, the rule inverter 130 is configured to invert the rules (software rules) stored/customized within the rules framework 120 by a developer of a software program. The rule inverter 130 can invert rules which do not call subroutines, etc. Here, the output is either derived directly from the input or simple table look-ups are performed. These basic derivation rules already have a lot of use cases. The rule inverter 130 may be incorporated into a software application or service which consumes derivation rules and which lacks analysis capabilities and suffers from performance issues as mentioned above. It is known that multiple application areas exist, where this kind of derivation rules is heavily used.

Instead of executing the derivation rule for all relevant input (and instead of remembering the output for a given input), the rule inverter 130 may create an inversed version of the "automatically" during the activation process of the rule. This is similar to the inverse function in a mathematical sense but is not the same. As will be appreciated, an inverse function in a mathematical sense requires injectivity of the original function. This means, that only up to one input might lead to a specific output. This is not the case for the discussed custom rules. Here, a variety or even ranges of input values might lead to the same output. Therefore, the rule itself is analyzed to derive conditions for retrieving all possible input values which would lead to a particular/given output. That is, each possible output value is mapped to all possible input values that create that output value. In doing so, the rule inverter 130 can identify any overlaps and discrepancies between the input values and the output values and make it clear how each output value is generated. This results in better performance at runtime than mapping input values to output values which can often require redundant and multiple executions of possible rules to find the correct rule and all input for a given output.

Referring to FIG. 1A, a process 100A is shown in which a developer, via a software application 110, creates a custom rule and stores the custom rule within the rules framework 120. In this example, the rules framework 120 is used by the software application 110 to enforce custom rules within the software application 110. For example, a developer may use a developer terminal 102 such as a personal computer, laptop, desktop, etc., to create a custom rule. Here, the developer terminal 102 may connect to a host platform (not shown) such as a web server, cloud platform, database node, or the like, which hosts the software application 110. The host platform may also host the rules framework 120 and/or the rule inverter 130, but embodiments are not limited thereto. As another example, the rules framework 120 and/or the rule inverter 130 may be externally accessed via a host server of the software application 110.

To install the custom rule, the developer terminal 102 may send a request (e.g., an API call, etc.) to an API 121 of the rules framework 120 which transfers the custom rule to a rules application 122 within the rules framework 120 where it is installed/stored within a rules repository 123 of the rules framework 120. For example, the developer may "activate" the custom rule within the rules framework 120 via the API call. When the custom rule is activated or otherwise installed, an event or other signal/call may be sent to the rule inverter 130 along with the rule itself. In response, the rule inverter 130 may generate an inverse of the custom rule and return the inverse of the custom rule to an inverted rules repository 124 within the rules framework 120. Examples of inverting custom rules are described below with respect to the examples of FIGS. 3A-3D.

FIG. 1B illustrates a more detailed process 100B in which the rule inverter 130 receives an activation event from an eventing mechanism (event trigger 125) integrated within the rules framework 120. For example, the event trigger 125 may be installed via a software update, a plug-in, or the like. That is, the event trigger 125 can be integrated into an existing rules framework to enhance/modify the processing of rules via the rules framework. The event trigger 125 can detect a custom rule creation or activation such as addition of a new custom rule, modification to an existing custom rule, deletion of a custom rule, and the like. When a custom rule activation of some kind is detected, an event notifying of such activation is sent from the event trigger 125 to an event handler 131 installed within the rule inverter 130.

The event is then caught by the event handler 131 within the rule inverter 130. The event may identify the rule being activated, for example, with a unique identifier of the rule within the rules framework 120, a name of the rule, and the like. The communications between the event trigger 125 and the event handler 131 may be performed on a secure channel. For example, the rules framework 120 may establish a channel of secure network communication with the rule inverter 130 via the event trigger 125 mechanism within the rules framework 120 and the event handler 131 within the rule inverter 130. The channel may be established via a network (e.g., public internet, private, etc.) automatically upon installation of the event trigger 125 within the rules framework 120.

In addition to notifying the rule inverter 130 of the new custom rule being activated, the rules framework 120 may also pass the rule content of the new rule from the rules repository 123 within the rules framework 120 to the rule inverter 130. For example, the rules repository 123 may transmit the custom rule content directly to a rule analyzer 132 within the rule inverter 130 or to the event handler 131 which passes the custom rule content to the rule analyzer 132. When the custom rule content is received by the rule analyzer 132, it can analyze the custom rule to determine each possible output value for the rule. In other words, the rule analyzer 132 can identify all possible output values. Next, the rule content is passed to a result condition derivation (RCD) module which identifies which conditions are associated with which output values.

Furthermore, a corresponding plugin 133 associated with the rules framework 120 may be accessed to identify which conditions are associated with which output values. In other words, the conditions that cause each respective output value, and not the other way around where the conditions specify how input values are used to derive output values. By inverting the rule, the solution creates a more deterministic rule that can be processed efficiently by the rules framework without creating overlapping issues amongst rules. The result is an inverse of the custom rule which can be stored within an inverted rules repository 134 of the rule inverter 130. In addition, or instead, the inverse of the custom rule may be delivered to the inverted rules repository 124 within the rules framework 120. Here, the original rule will remain in the rules repository 123 and the inverted rule may be stored within the inverted rules repository 124 with a pointer (e.g., an identifier, etc.) of the original rule stored within the rules repository 123 such as a name of the rule, an address where the rule is stored, a GUID, and the like.

When the inverted rules are needed by a software application, the inverted rules can be retrieved directly from the inverted rules repository 134 of the rule inventor 130 by the software application 110 via an API 135 of the rule inverter 130. As another example, the rules can be retrieved from the inverted rules repository 124 of the rules framework 120 via the API 135. In some embodiments, the inverted rules stored within either of the inverted rules repository 124 or the inverted rules repository 134 can be exposed by the API 135. Thus, a software may transmit an API call (e.g., with a query for a rule) to the API 135 for an inverted rule. For example, the API call may include an identifier of the inverted rule and/or even the original rule.

FIG. 2 illustrates a process 200 of detecting activation of a custom rule and converting the custom rule into an inverse of the custom rule in accordance with example embodiments. In the example of FIG. 2, the solution is carried out based on a combination of an eventing mechanism integrated into a rules framework and a rule inverter which may be externally connected to the rules framework via a network or the like. The integration of the eventing mechanism into the rules framework may be executed via a plugin or other form of software extension thus enabling an existing rules framework to integrate this solution.

Referring to FIG. 2, in 210, a developer may access a custom rules framework to develop a custom rule for their software program such as a service, an application, an application programming interface, a code module, and the like. The custom rule may be created via a development environment such as an integrated development environment (IDE) or the like. The custom rule may include one or more input values mapped to one or more output values via one or more conditions. A custom rule may include an if/else statement with different conditions between the "if" and the "else." In 212, the developer may activate the custom rule via the rules framework thereby triggering the rule to be activate within the software program that the developer is working with. In response to the activation of the rule, in 214, an eventing mechanism within the rules framework may detect the activation of the custom rule and issue an event to a rule inverter. The event may identify the custom rule by its unique identifier within the rules framework and/or the external software program it's being used with. The event may also include information about the custom rule itself including the logic, source code, and the like, used to implement the rule.

In 220, the event issued from the rules framework may be received/caught by an event handler within the rule inverter. In 222, possible output values/result values for the custom rule are determined and in 224 the conditions associated with each of the possible output values are identified and paired with the possible output values to create an inverted custom rule in which each output is specifically designated to each possible input. As further described in the examples of FIGS. 3A-3D, each possible output may be one-to-one mapped to a single input thereby simplifying the logic. In 226, the rule inverter may update the rules repository within the rules framework. For example, the rule inverter may trigger the custom rule to be deleted and the inverted rule to be stored in its place.

FIG. 3A illustrates a process 310 of converting a custom rule 312 into an inverted rule 314 which is an inverted version of the custom rule 312. Referring to FIG. 3A, the custom rule 312 includes a mapping of an input field 'A' to an output field 'B' and a rule which identifies conditions for mapping input values stored in the input field 'A' to output values stored in the output field 'B'. In particular, the rule includes an if-else statement with a first condition (if) that specifies an output value of R1 in the output field R and a second condition (else) that specifies an output value of R2 in the output field of R. The conditions are based on input values for input field A (i.e., if A is between A1-A9, then the output value is R1, else R2).

The custom rule 312 may be received by the rule inverter 130 and converted into an inverted rule 314 which is an inverse of the custom rule 312. The inverse of the custom rule 312 may include an output value mapped to a particular condition for the custom rule 312. In this example, the rule inverter 130 may identify the two output values included in the custom rule 312 which includes the values R1 and R2. The rule inverter 130 also identifies the conditions associated with each of those output values in the custom rule 312. In this case, the condition for R1 is that the input field have a value between A1-A9, and the condition for R2 is anything other than A1-A9. Here, the two output values can be mapped to their corresponding conditions to generate the inverted rule 314. The inverted rule 314 may be written into a repository of rules stored within a rules framework/application. The custom rule 312 may remain as well within the rules repository and the inverted rule 314 can be stored in an inverted rules repository. By keeping the original rule, the original custom rule can be used to determine all possible inputs for a given output.

FIG. 3B illustrates a process 320 of converting a custom rule 322 into an inverted rule 324 via the rule inverter 130. Referring to FIG. 3B, the custom rule 322 includes two different input fields mapped to a same output field and a rule which identifies conditions for mapping input values stored in the input fields to output values stored in the output field 'B'. In particular, the rule includes a conditional statement with four different conditions. In this example, the rule inverter 130 may invert the custom rule 322 by identifying the different output values in the output field which include four different output values (R1, R2, R3, and R4). Next, the rule inverter 130 may identify the conditions associated with each of the different output values and create mappings thereto. Thus, the inverted rule 324 includes four possible output values one-to-one mapped to four possible conditions.

Figure 3C:
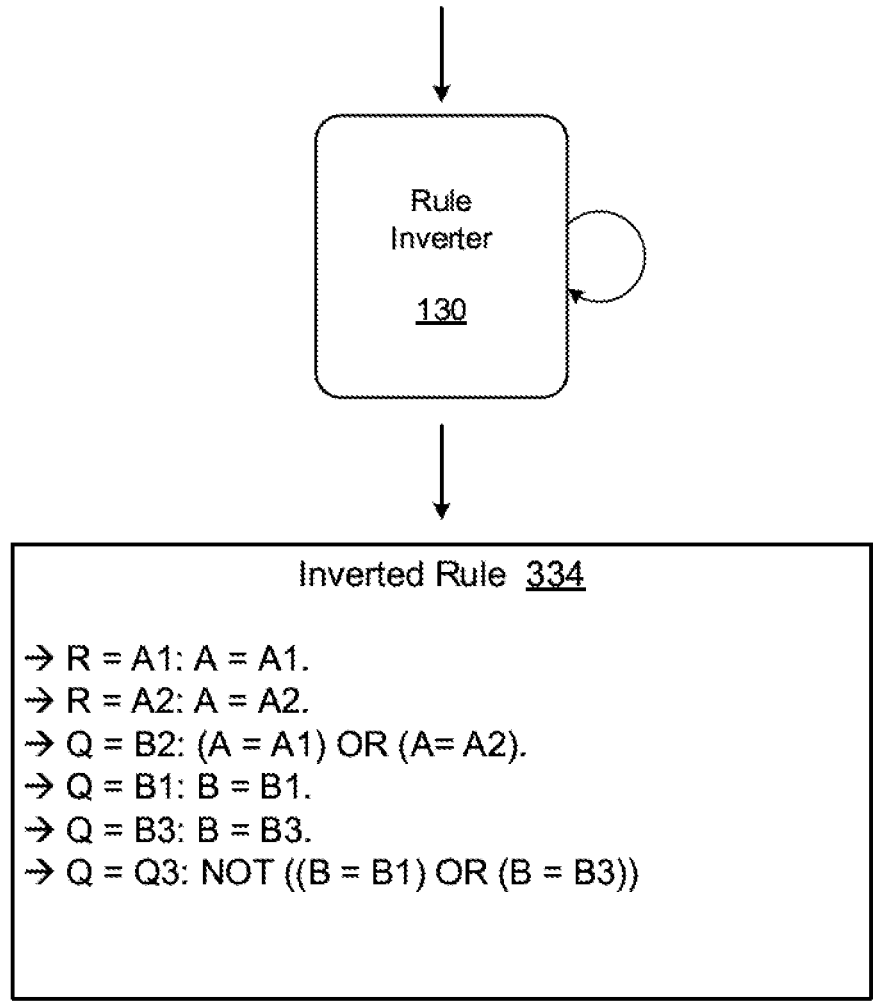

FIG. 3C illustrates a process 330 of converting a custom rule 332 into an inverted rule 334 via the rule inverter 130. Referring to FIG. 3C, the custom rule 332 includes two input fields mapped to two output fields in a multi-dimensional arrangement and a rule specifying conditions for mapping values within the two input fields to the two output fields. That is, the output of the rule consists of two fields (two-dimensional). However, the same process may also be performed for higher dimensions of data (multi-dimensional). The possible results for each dimension are treated separately.

The rule inverter 130 may combine conditions by a logical AND to support two or higher dimensions. Considering the result R=A1/Q=Q3, the combined condition would be A=A1 and NOT (B=B1 OR B=B3). In other words, the dimensions are treated independently, and there is no need to provide conditions for each possible combination of input values. (Otherwise, the memory would easily be exceeded in higher dimensions.) Instead, the specific multi-dimensional condition is built by combining one-dimensional conditions using logical operators. In this example, the rule inverter 130 identifies six possible output values (A1, A2, B2, B1, B3, and Q3) from the custom rule 332 and the corresponding six conditions that correspond to the six possible output values (i.e., two for R and four for Q which should each be treated independently) and the rule inverter 130 maps the output values to their corresponding conditions to generate the inverted rule 334.

FIG. 3D illustrates a process 340 of converting a custom rule 342 into an inverted rule 344 which is an inverted version of the custom rule 342. Referring to FIG. 3D, the custom rule 342 includes a mapping of an input field 'A' to an output field 'R' and a rule which identifies conditions for mapping input values stored in the input field 'A' to output values stored in the output field 'B' based on a rule F which is retrieved from a field of 'A'. The rule depends on a field F which is retrieved form a field A via table look-up. The relation between field A and field F can be retrieved from a table F TAB. In particular, the rule includes an if-else statement with a first condition (if) that specifies two input values of F that map to an output value in the output field R and a second condition (else) that specifies an output value of R1 otherwise. The conditions are based on input values for field F which is retrieved from input field A (i.e., if F is F1 or F2 then R=F, else R=R1).

The custom rule 342 may be received by the rule inverter 130 and converted into an inverted rule 344 which is an inverse of the custom rule 342. The inverse of the custom rule may include an output value mapped to a particular condition. In this example, the rule inverter 130 may identify the three possible output values included in the custom rule 342 which includes the values F1, F2, and R1. The rule inverter 130 also identifies the conditions associated with each of those output values. In this case, the condition for F1 and F2 are similar but there is still a difference. In particular, the output value stored in R is F1 when the input value in the field F is F1, and the output value of F2 is stored in R when the input value of F is F2. Furthermore, a third condition is that neither of the first two conditions exist. In this case, the catch all can determine if neither the first or second condition exist, then condition three is satisfied. The rule inverter 130 may map the three output values to their corresponding conditions within the inverted rule 344.

Figure 4:
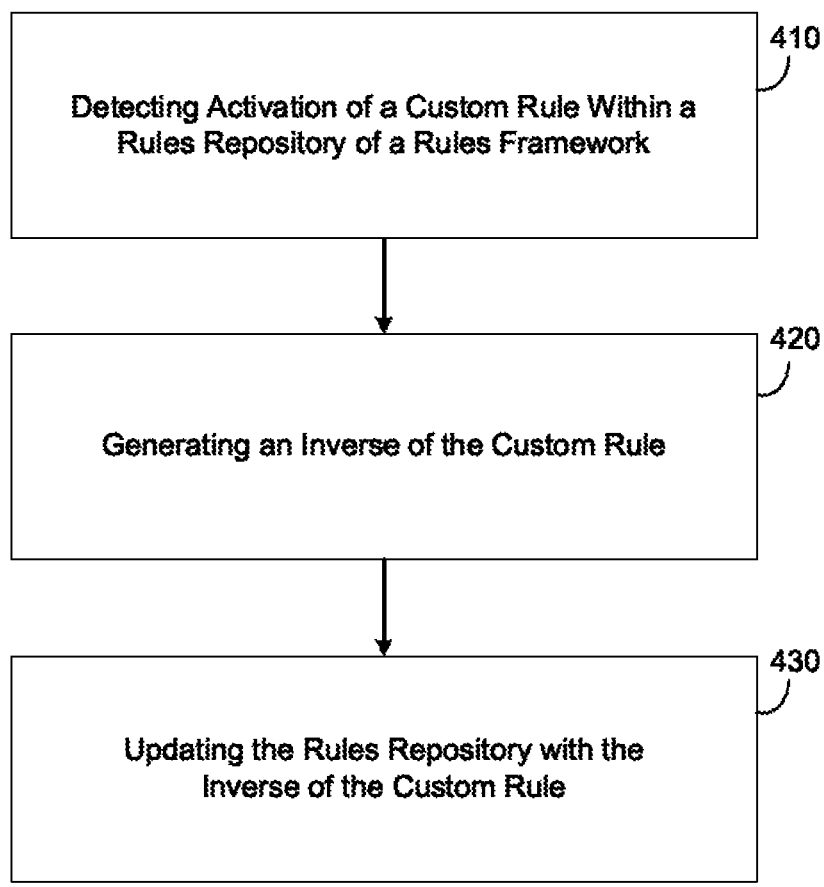
FIG. 4 is a diagram illustrating a method of modifying a custom-created rule of a software program in accordance with an example embodiment.

FIG. 4 illustrates a method 400 of modifying a custom-created rule of a software program in accordance with an example embodiment. For example, the method 400 may be performed by a database node, a cloud platform, a server, a computing system (user device), a combination of devices/nodes, or the like. Referring to FIG. 4, in 410, the method may include detecting an inclusion of a custom rule within a software program, wherein the custom rule comprises one or more input values, one or more output values, and a plurality of conditions for converting the one or more input values into the one or more output values. It should also be appreciated that the method may not need to detect activation of the custom rule but may instead just receive the custom rule from a rules framework such as via an API request or the like.

In 420, the method may include generating an inverse of the custom rule, wherein the inverse of the custom rule comprises a plurality of inverse statements, and each inverse statement includes an output value from among the one or more outputs mapped to an input value from among the one or more input values and a different condition among the plurality of conditions. Examples of inverting a rule are described in FIGS. 3A-3D. In 430, the method may include updating a rules repository of the software program with the inverse of the custom rule.

In some embodiments, the method may further include receiving a query for the custom rule from a process of the software program, and in response to receiving of the query, identifying an inverse statement in the custom rule that corresponds to a condition within the query, generating a response based the inverse of the custom rule, and transmitting the response to the process. In some embodiments, the custom rule may include an if-else condition, case statements, switch statements, different preconditions which can be combined using AND and OR, etc., and the generating comprises generating a first inverse statement for the if condition which maps a first output value to a first input value based on the if condition and generating a second inverse statement for the else condition which maps a second output value to a second input value based on the else condition.

In some embodiments, the custom rule may include a plurality of input values mapped to a single output value based on the plurality of conditions, respectively, and the generating may include generating a plurality of inverse statements where each inverse statement comprises the output value being mapped to a different input value based on a different condition. In some embodiments, the custom rule may include a single input value mapped to a plurality of output values based on the plurality of conditions, respectively, and the generating comprises generating a plurality of inverse statements where each inverse statement comprises a different output value being mapped to the input value based on a different condition.

In some embodiments, a rules framework of the software program issues an event associated with the activation of the custom rule, and the detecting comprises detecting the event issued by the rule framework. In some embodiments, the updating may include storing the inverted rule within an inverse rules repository of the software program. In some embodiments, the method may further include adding a clause to a structured query language (SQL) query with an inverse statement from among the plurality of inverse statements within the inverse of the custom rule.

Figure 5:
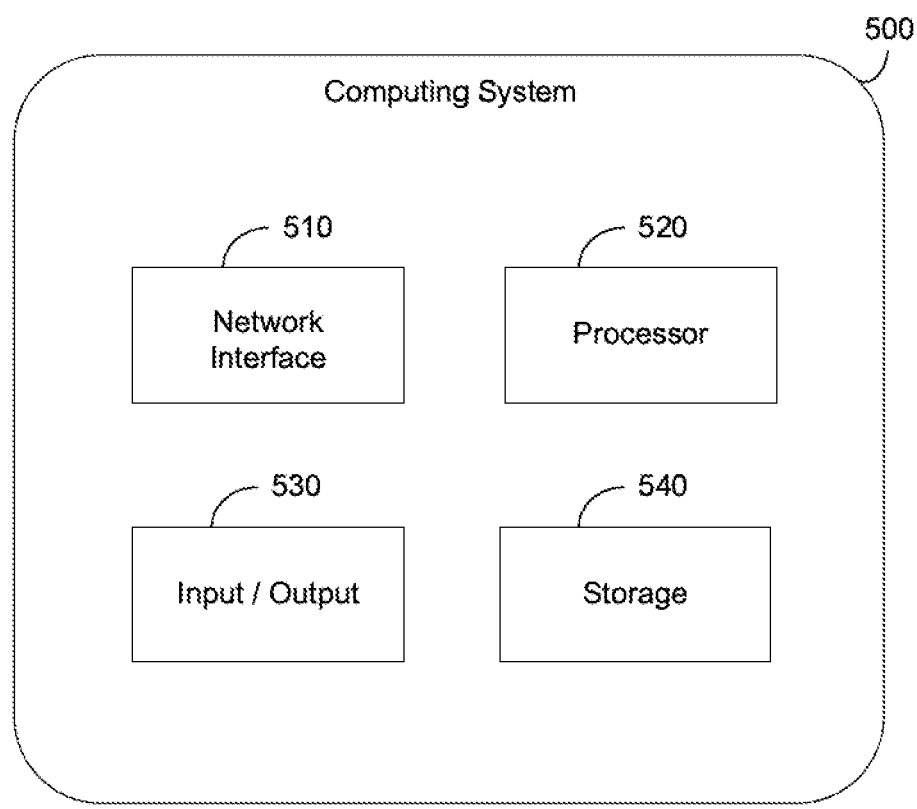
FIG. 5 is a diagram illustrating a computing system for use in the examples herein in accordance with an example embodiment.

FIG. 5 illustrates a computing system 500 that may be used in any of the methods and processes described herein, in accordance with an example embodiment. For example, the computing system 500 may be a database node, a server, a cloud platform, or the like. In some embodiments, the computing system 500 may be distributed across multiple computing devices such as multiple database nodes. Referring to FIG. 5, the computing system 500 includes a network interface 510, a processor 520, an input/output 530, and a storage 540 such as an in-memory storage, and the like. Although not shown in FIG. 5, the computing system 500 may also include or be electronically connected to other components such as a display, an input unit(s), a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The input/output 530 may include an interface, a port, a cable, a bus, a board, a wire, and the like, for inputting and outputting data to and from the computing system 500. For example, data may be output to an embedded display of the computing system 500, an externally connected display, a display connected to the cloud, another device, and the like. The network interface 510, the input/output 530, the storage 540, or a combination thereof, may interact with applications executing on other devices.

The storage 540 is not limited to a particular storage device and may include any known memory device such as RAM, ROM, hard disk, and the like, and may or may not be included within a database system, a cloud environment, a web server, or the like. The storage 540 may store software modules or other instructions which can be executed by the processor 520 to perform the method shown in FIG. 4. According to various embodiments, the storage 540 may include a data store having a plurality of tables, records, partitions and sub-partitions. The storage 540 may be used to store database records, documents, entries, and the like.

As an example, the processor 520 may be configured to detect activation of a custom rule within a software program, wherein the custom rule comprises a plurality of conditions for converting one or more input values into the one or more output values. As another example, the processor 520 may generate an inverse of the custom rule, wherein the inverse of the custom rule comprises a plurality of statements which each comprise a single output value from among the one or more outputs mapped to a single input value from among the one or more input values and a different condition among the plurality of conditions. As another example, the processor 520 may update rules of the software program within the rules repository with the inverse of the custom rule.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a memory storing a rules repository; and
a processor configured to automatically:
detect an activation of a custom rule within a rules framework of a software program, wherein the custom rule comprises a plurality of conditions for converting one or more input values into one or more output values;
generate an inverse of the custom rule, wherein the inverse of the custom rule comprises a plurality of statements which each comprise a single output value from among the one or more outputs mapped to a single input value from among the one or more input values and a different condition among the plurality of conditions;
update a rule repository associated with the rules framework with the inverse of the custom rule by storing a mapping table which indicates a particular output value of the one or more output values, a corresponding input value of the one or more input values, and one or more particular conditions of the plurality of conditions associated with the corresponding input value; and
in response to receiving a query for the custom rule from a process, the query having a particular condition, identify an inverse statement of the custom rule that corresponds to the particular condition, generate a response based on the inverse statement of the custom rule, and transmit the response to the process.

2. The computing system of claim 1, wherein the processor is further configured to receive a query for the custom rule from a process of the software program via an application programming interface (API), and in response to receipt of the query, identify a statement, generate a response based the statement, and transmit the response to the process.

3. The computing system of claim 1, wherein the custom rule comprises an if-else condition, and the generating comprises generating a first statement for the if condition which maps a first output value to a first input value based on the if condition and generating a second statement for the else condition which maps a second output value to a second input value based on the else condition.

4. The computing system of claim 1, wherein the custom rule comprises a plurality of input values mapped to a single output value based on the plurality of conditions, respectively, and the generating comprises generating a plurality of statements where each statement comprises the output value being mapped to a different input value based on a different condition.

5. The computing system of claim 1, wherein the custom rule comprises a single input value mapped to a plurality of output values based on the plurality of conditions, respectively, and the generating comprises generating a plurality of statements where each statement comprises a different output value being mapped to the input value based on a different condition.

6. The computing system of claim 1, wherein the processor is configured to detect activation of the custom rule based on an activation event issued by an event handler of the rules framework.

7. The computing system of claim 1, wherein the processor is configured to store the custom rule in a rules repository of the rules framework and store the inverse of the custom rule in a different rules repository designated for inverted rules.

8. The computing system of claim 1, wherein the processor is further configured to add a clause to a structured query language (SQL) query with a statement from among the plurality of statements within the inverse of the custom rule, and submit the SQL query to a database.

9. A method comprising:
detecting a custom rule within a rules framework of a software program, wherein the custom rule comprises one or more input values, one or more output values, and a plurality of conditions for converting the one or more input values into the one or more output values;
generating an inverse of the custom rule, wherein the inverse of the custom rule comprises a plurality of inverse statements, and each inverse statement includes an output value from among the one or more outputs mapped to an input value from among the one or more input values and a different condition among the plurality of conditions;
updating a rules repository associated with the rules framework with the inverse of the custom rule by storing a mapping table which indicates a particular output value of the one or more output values, a corresponding input value of the one or more input values, and one or more particular conditions of the plurality of conditions associated with the corresponding input value; and in response to receiving a query for the custom rule from a process, the query having a particular condition, identifying an inverse statement of the custom rule that corresponds to the particular condition, generating a response based on the inverse statement of the custom rule, and transmitting the response to the process.

10. The method of claim 9, wherein the method further comprises:

receiving a query for the custom rule from a process of the software program via an application programming interface (API); and in response to receiving of the query, identifying a statement, generating a response based the statement, and transmitting the response to the process.

11. The method of claim 9, wherein the custom rule comprises an if-else condition, and the generating comprises generating a first inverse statement for the if condition which maps a first output value to a first input value based on the if condition and generating a second inverse statement for the else condition which maps a second output value to a second input value based on the else condition.

12. The method of claim 9, wherein the custom rule comprises a plurality of input values mapped to a single output value based on the plurality of conditions, respectively, and the generating comprises generating a plurality of inverse statements where each inverse statement comprises the output value being mapped to a different input value based on a different condition.

13. The method of claim 9, wherein the custom rule comprises a single input value mapped to a plurality of output values based on the plurality of conditions, respectively, and the generating comprises generating a plurality of inverse statements where each inverse statement comprises a different output value being mapped to the input value based on a different condition.

14. The method of claim 9, wherein the detecting comprises detecting activation of the custom rule based on an activation event issued by an event handler of the rules framework.

15. The method of claim 9, wherein the updating comprises storing the custom rule in a rules repository of the rules framework and storing the inverse of the custom rule in a different rules repository designated for inverted rules.

16. The method of claim 9, wherein the method further comprises adding a clause to a structured query language (SQL) query with an inverse statement from among the plurality of inverse statements within the inverse of the custom rule, and submitting the SQL query to a database.

17. A non-transitory computer-readable medium comprising instructions which when executed by a processor cause a computer to perform a method comprising:

detecting an activation of a custom rule within a rules framework of a software program, wherein the custom rule comprises a plurality of conditions for converting one or more input values into one or more output values;

generating an inverse of the custom rule, wherein the inverse of the custom rule comprises a plurality of inverse statements, and each inverse statement includes an output value from among the one or more outputs mapped to an input value from among the one or more input values and a different condition among the plurality of conditions;

updating a rules repository associated with the rules framework with the inverse of the custom rule by storing a mapping table which indicates a particular output value of the one or more output values, a corresponding input value of the one or more input values, and one or more particular conditions of the plurality of conditions associated with the corresponding input value; and in response to receiving a query for the custom rule from a process, the query having a particular condition, identifying an inverse statement of the custom rule that corresponds to the particular condition, generating a response based on the inverse statement of the custom rule, and transmitting the response to the process.

18. The non-transitory computer-readable medium of claim 17, wherein the method further comprises:

receiving a query for the custom rule from a process of the software program via an application programming interface (API); and in response to receiving of the query, identifying a statement, generating a response based the statement, and transmitting the response to the process.

19. The non-transitory computer-readable medium of claim 17, wherein the custom rule comprises an if-else condition, and the generating comprises generating a first inverse statement for the if condition which maps a first output value to a first input value based on the if condition and generating a second inverse statement for the else condition which maps a second output value to a second input value based on the else condition.

20. The non-transitory computer-readable medium of claim 17, wherein the custom rule comprises a plurality of input values mapped to a single output value based on the plurality of conditions, respectively, and the generating comprises generating a plurality of statements where each statement comprises the output value being mapped to a different input value based on a different condition.

* * * * *